Patented Jan. 26, 1932

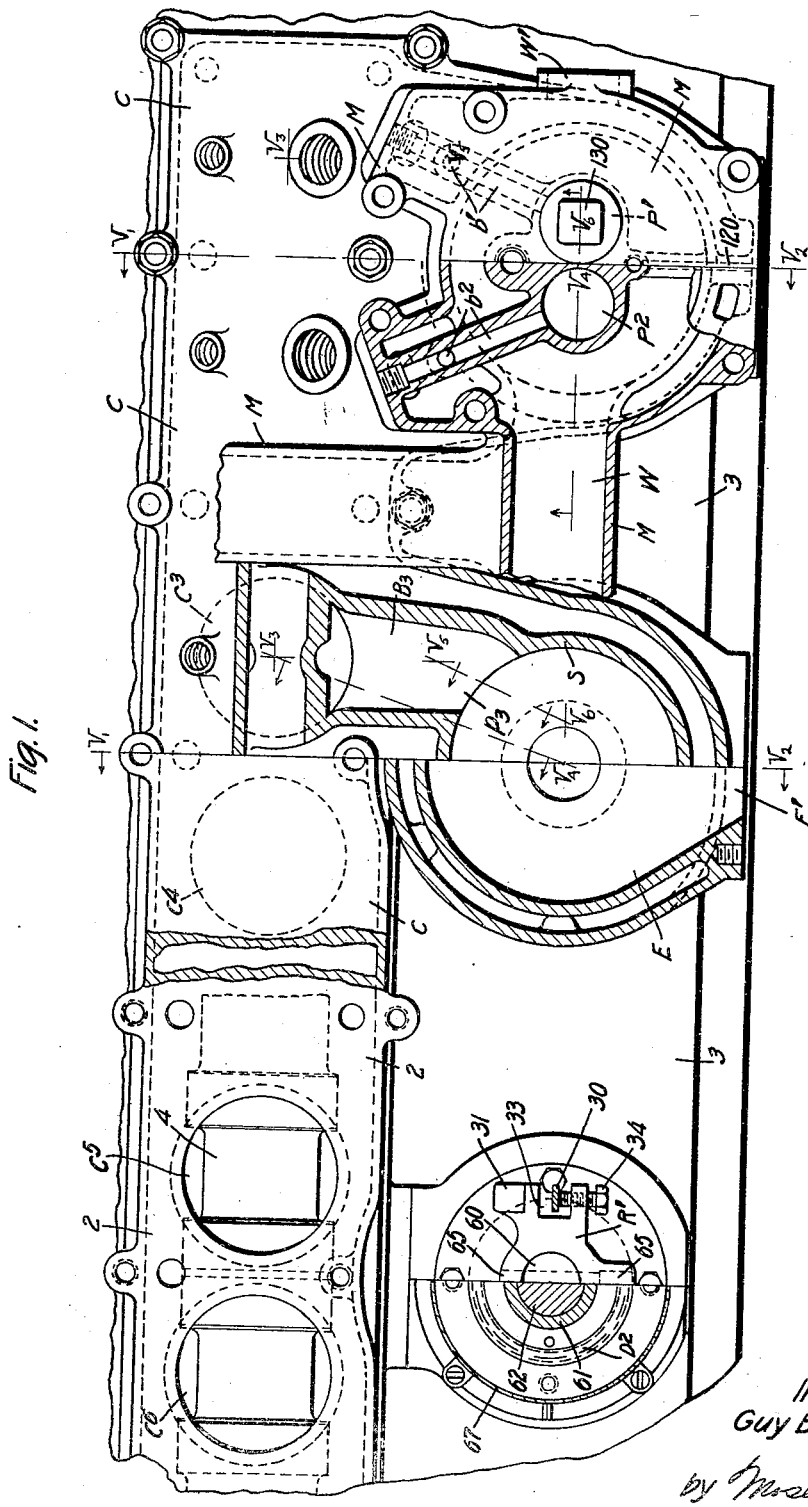

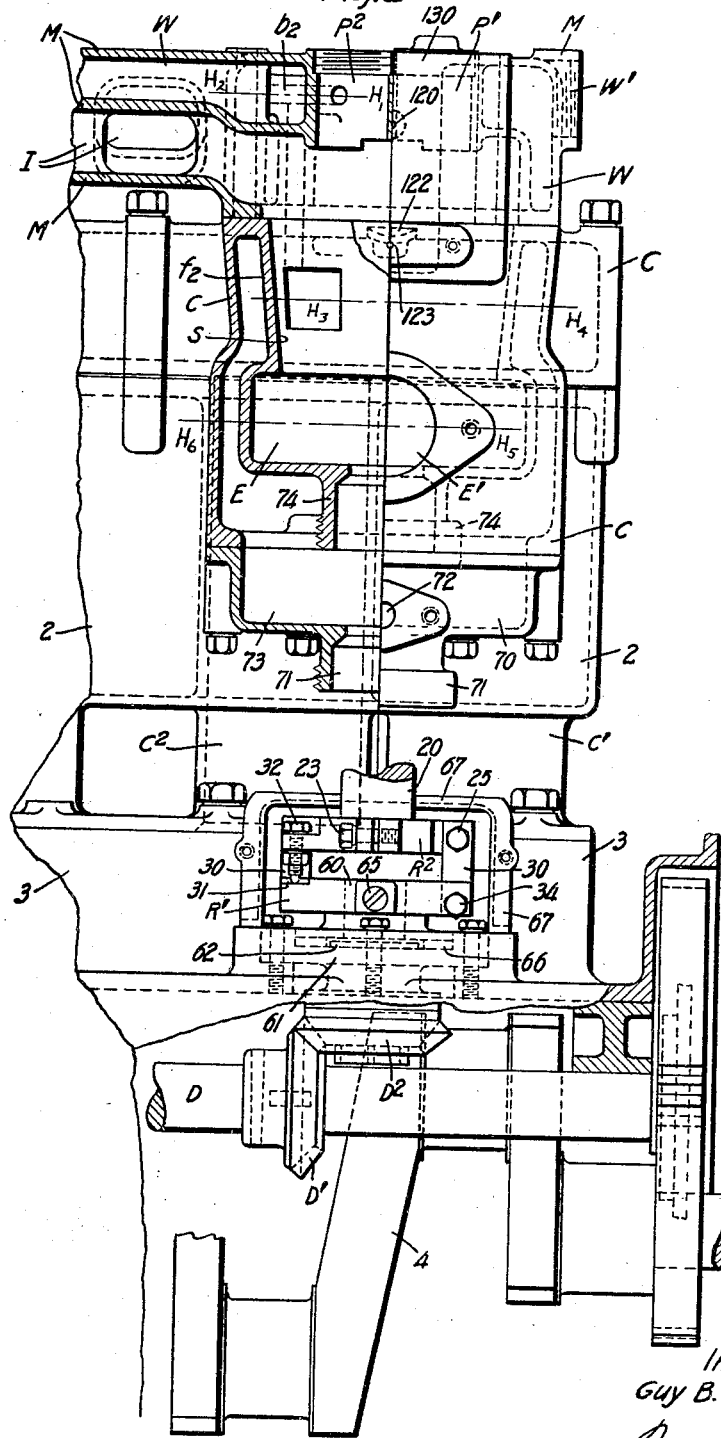

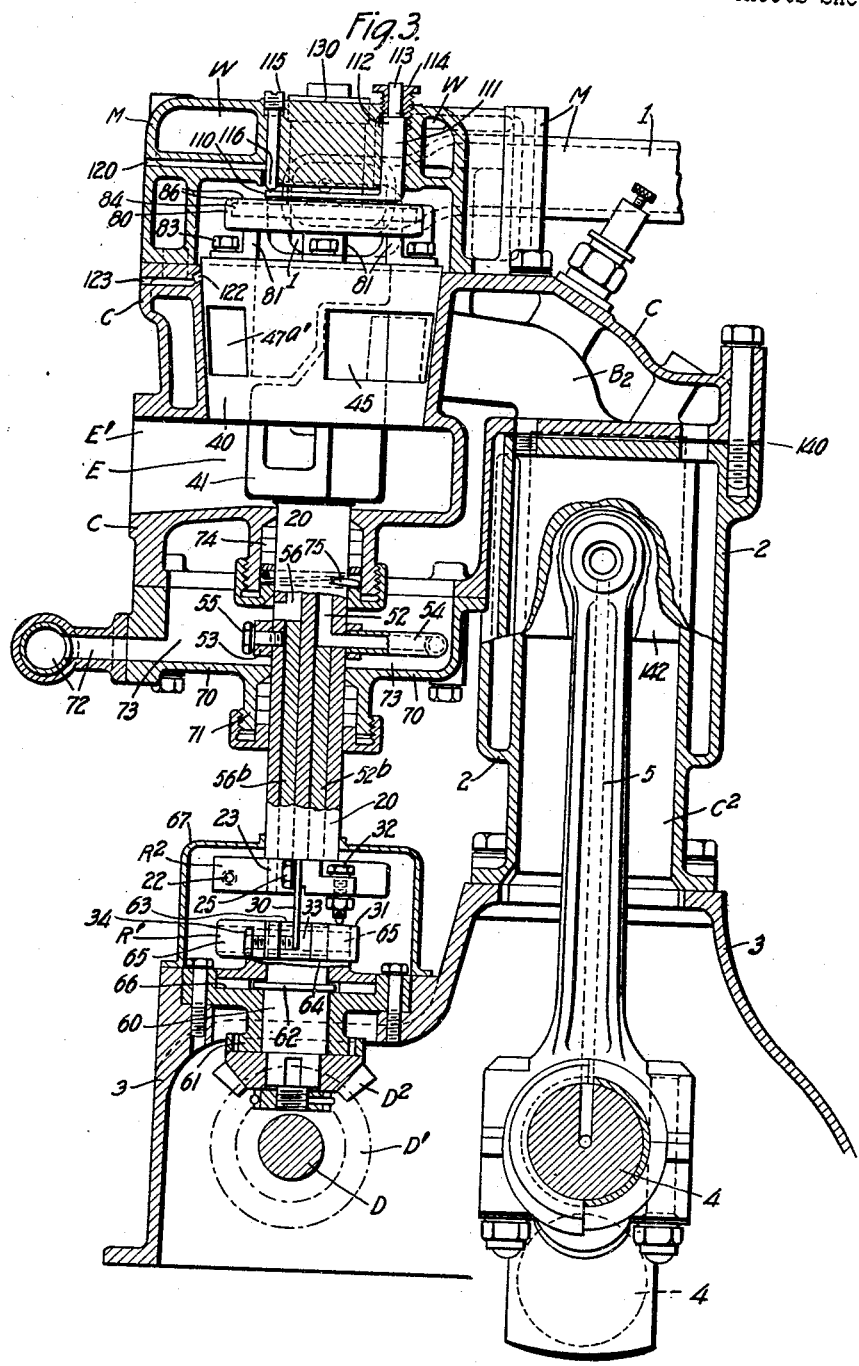

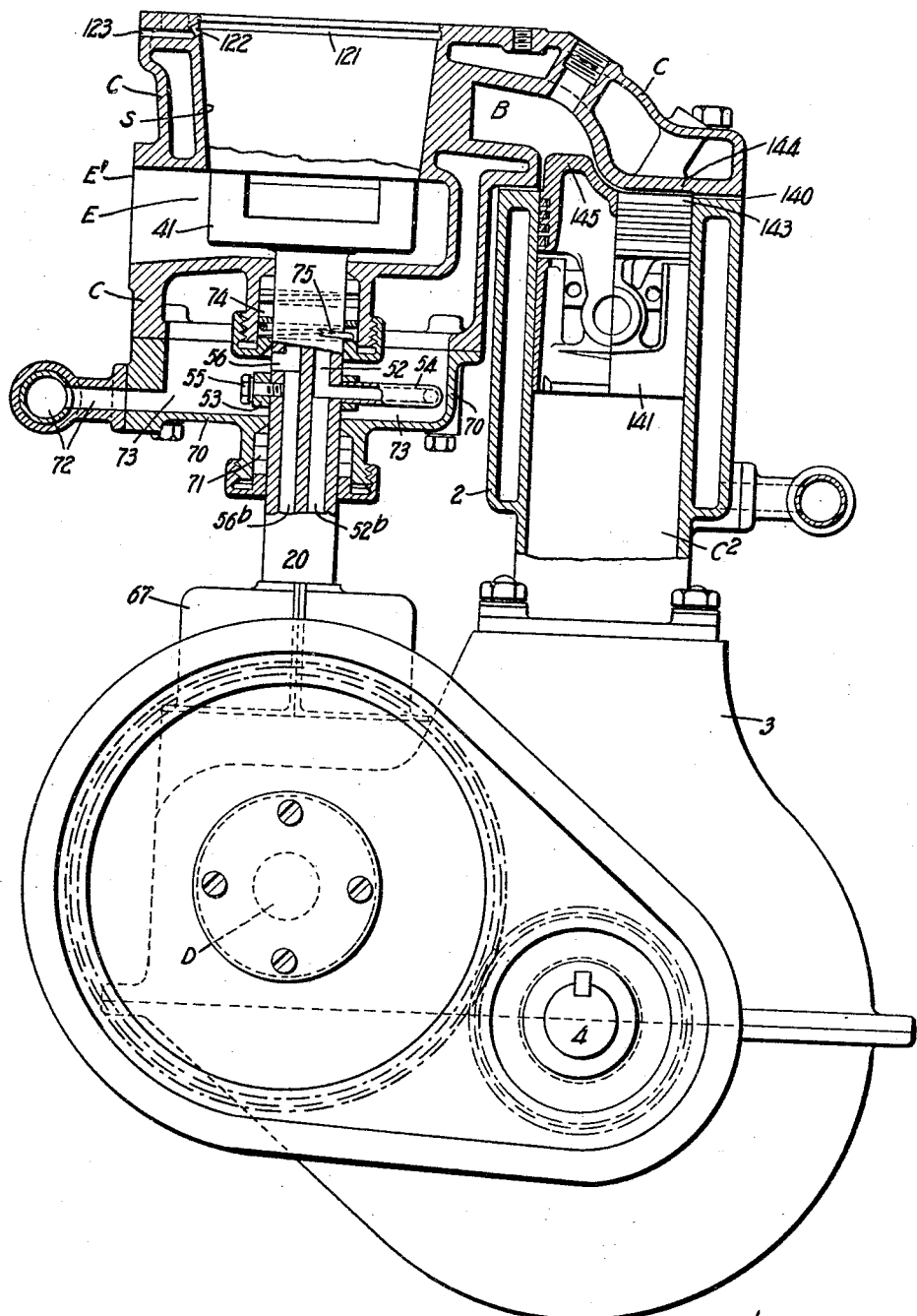

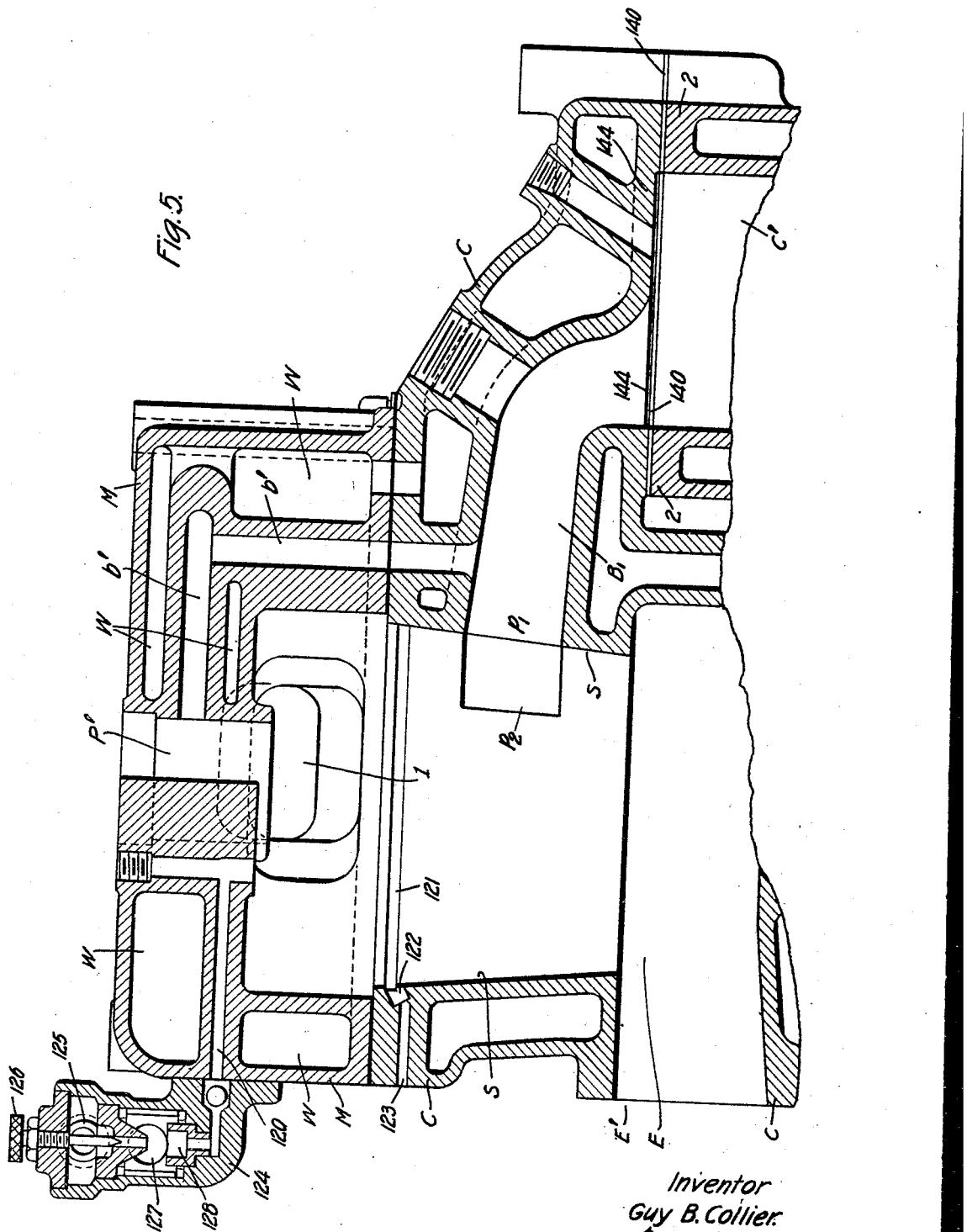

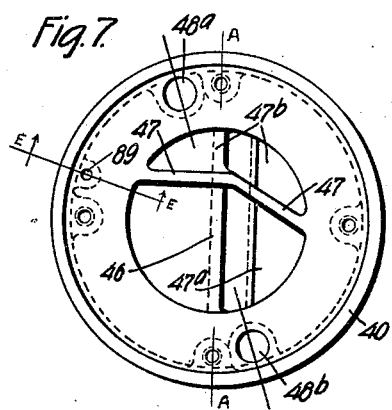

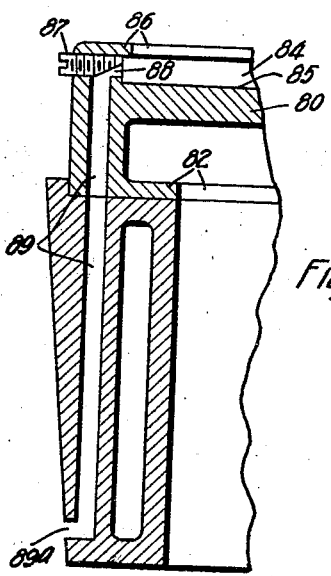
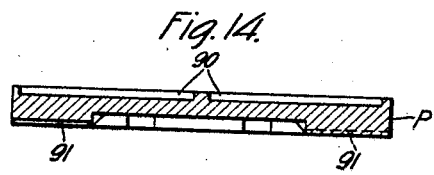
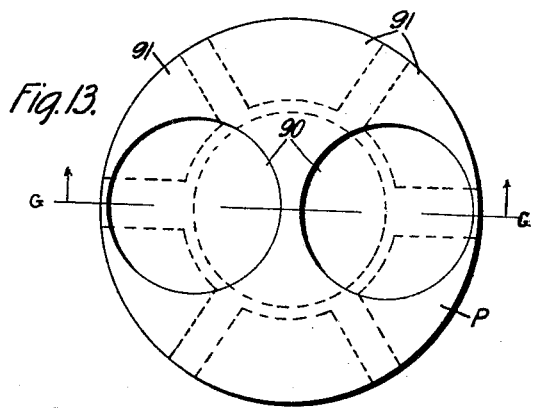
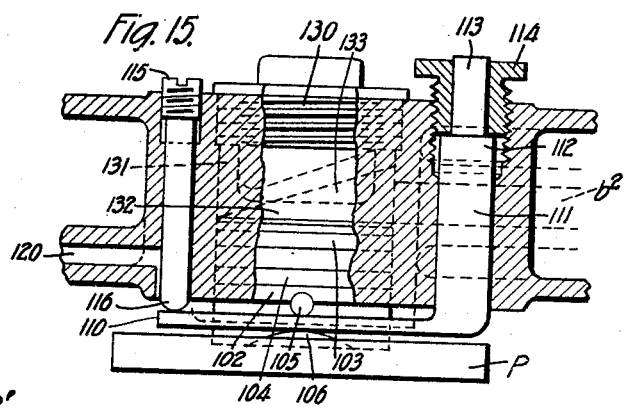
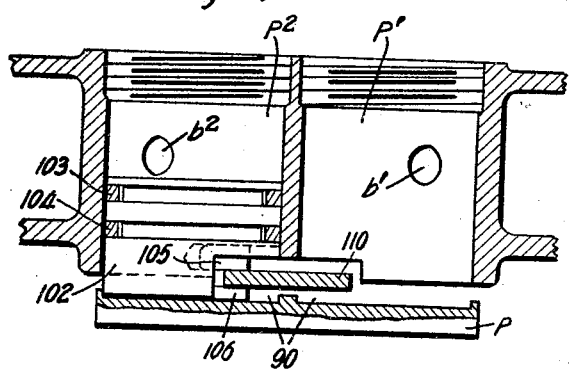

1,842,823

UNITED STATES PATENT OFFICE

GUY B. COLLIER, OF KINDERHOOK, NEW YORK; CHARLES SAGER COLLIER, OF CHEVY CHASE, MARYLAND, AND ELVIRA BREWSTER COLLIER, OF NEW YORK, N. Y., EXECUTORS OF SAID GUY B. COLLIER, DECEASED

ROTARY VALVE INTERNAL COMBUSTION MOTOR

Application filed February 11, 1929. Serial No. 339,020.

The present invention relates to internal combustion motors and more particularly to motors of this type employing rotary valve mechanism for controlling the flow of gas to and from the cylinder. This general type of construction is disclosed in my prior Patent No. 1,040,277, dated Oct. 8, 1912. In this construction a conical valve rotates within a chamber and controls each two adjacent cylinders, the valve being balanced synchronously against the cylinder pressure except for the suction stroke.

In order to obtain a complete synchronous balancing of the valve with respect to a cylinder for each of the 4 strokes, in a simple, practical, and efficient manner, the constructive features disclosed in my prior Patent No. 1,692,628, dated Nov. 20, 1928, are embodied in the working details of the present invention. In that patent it is shown that the balance plug chamber in communication with a cylinder, the balance plug, the balance plug spring, the plug shoe resting on top of the valve member, constitute the simple constructive elements which axially balance the valve in synchronism with pressure changes in a cylinder, and also independently of what is taking place in the adjacent cylinder.

The constructive features, near end of valve stem providing for a timing adjustment, a flexible driving connection for the valve, and means to slightly raise the valve from its seat when the driving resistance exceeds a predetermined value, as described in the Patent No. 1,692,628, are embodied in the present invention.

One feature of the present invention provides a detachable cylinder head, containing the valve chambers whose axes are substantially vertical, with a combustion chamber leading to top of cylinder and so constructed as to permit a higher compression without the so called combustion knock resulting when a large part of piston is initially exposed to combustion processes. This type of detachable head also reduces construction costs of the motor.

A further feature of the present invention is more efficient transmission of the synchronous balancing pressure by a direct passage from improved combustion space to top of balance plug.

A still further feature of the present invention embodies an improved water cooled valve; also provisions insuring effective water circulation, for which the detachable cylinder head construction is admirably adapted. Still further features of the present invention will be more particularly pointed out in the following description.

In the accompanying drawings illustrating the preferred form of the invention,

Fig. 1 represents a partial top plan view, partly in section, of an internal combustion motor with the cooperating rotary valve mechanism;

Fig. 2 is a side elevation, in part section, of the construction shown in Fig. 1, as relates to first pair of cylinders;

Fig. 3 is a section elevation of the construction shown in Fig. 2, taken upon the line $V_1 V_2$ of Fig. 1;

Fig. 4 is an end elevation of the construction shown in Figs. 1 and 2 showing a section in the planes $V_3 V_4$ and $V_4 V_2$ of Fig. 1;

Fig. 5 is an enlarged section elevation of upper parts of construction in Figs. 1, 2, and 3 taken on the line $V_3 V_5 V_6 V_4 V_2$ of Fig. 1;

Fig. 6 is an elevation of upper part of watercooled valve unit which rotates clockwise, looking down on its top, while the valve unit shown in Fig. 3 rotates counterclockwise;

Fig. 7 is a top view of valve proper as shown in Fig. 6 with the plug shoe reservoir member removed;

Fig. 8 is a horizontal section of the valve of Fig. 6 taken at mean level of the valve seat ports;

Fig. 9 is a section elevation of valve of Fig. 6 taken on line CC of Fig. 8;

Fig. 10 is a section elevation of valve on line BB of Fig. 8;

Fig. 11 is a horizontal section of valve on line FF of Fig. 6;

Fig. 12 shows section elevation of valve unit of Fig. 6 taken on line EE of Fig. 7, and relating to oiling provisions;

Fig. 13 gives a top view of balance plug shoe;

Fig. 14 is a section of shoe on line GG of Fig. 13;

Fig. 15 is a sectional elevation assembly view on line $V_1V_2$ of Fig. 1, of balance plug, spring and shoe unit shown on enlarged scale;

Fig. 16 is a sectional elevation in plane $V_6V_4$ of Fig. 1 of some parts related to Fig. 15.

In the illustrated embodiment of the invention, Fig. 1 represents a top view of about ¾ of the 8-cylinder motor, wherein are indicated cylinders $C^6$, $C^5$, $C^4$, $C^3$. The detachable cylinder head C is shown extending over 4 of the cylinders, while the valve manifold cap M is indicated for the first pair of cylinders. The part of M to left of $V_1V_2$ on first pair of cylinders is a section on $H_1H_2$ of Fig. 2, wherein $b'$ and $b^2$ indicate the balance passages communicating with the balance plug chambers $P'$ and $P^2$, while W denotes the water passage in M and overlying the intake part I of the manifold M of which $W'$ is the final water outlet. The part of cylinder head C just to right of $V_1V_2$ for cylinders $C^4$ and $C^3$ is a section on the mean port plane $H_3H_4$ as indicated in Fig. 2; $B_3$ is the combustion space in communication with cylinder $C^3$ and leading to the waterjacketed valve seat S, where its entrance is denoted by port $p_3$, see also Fig. 8 which valve section relates to cylinders $C^5$ and $C^6$, wherein the ports $p_5$ and $p_6$ are shown. The section to left of $V_1V_2$ for cylinders $C^3$ and $C^4$ is at the $H_5H_6$ level indicated in Fig. 2, represents the exhaust chamber E, just below bottom of valve seat S, having an outlet $E'$. A fragmentary view of crank shaft 4 is shown through open ends of cylinders $C^6$ and $C^5$ at top of cylinder bloc 2 in Fig. 1, where a top view of part of the driving mechanism $R'$ is shown.

Fig. 2 shows an exterior side elevation of cylinders $C'$ and $C^2$; part of the detachable cylinder head C whose section is given for the vertical plane $V_6V_4$; part of the valve manifold cap M whose part in section is in the $V_6V_4$ plane. In this figure is indicated the valve driving shaft D and the driving gears $D'$ and $D^2$, of which the latter is connected to lower member $R'$ of the release drive. The upper member $R^2$ of the release drive is connected by a clamping cap screw 21 and a taper pin to the lower end 23 of valve stem 20, providing a shoulder so that an axial lift may be transmitted, as further illustrated in Fig. 3. Springs 30 are fastened at diametrically opposite ends of $R^2$ by cap screws 25 and these springs constitute the driving connection to member $R'$. Cap screws 32 at opposite ends of member $R^2$ contact with the inclined surfaces 31 of member $R'$ causing the member $R^2$ to rise slightly in case the driving resistance transmitted by valve stem 20 causes the springs 30 to deflect beyond the normal position.

A shaft 60 is suitably keyed and otherwise fastened to gear $D^2$ which meshes with driving gear $D'$. Member 61 constitutes a thrust and cylindrical bearing member for shaft 60 and for the bottom of gear $D^2$, collar 62 and shaft 60 serving to keep this bearing in correct position with reference to member 61. The upper end of shaft 60 has an oblong hole, the top and bottom lines of which are indicated by 63 and 64 and through which passes a set pin 65, thus securing member $R'$ to shaft 60 so that the two must rotate as one unit, but this permits member $R'$ to slightly rise or fall with reference to shaft 60. The bottom part of member $R'$ has preferably six thrust pads shaped so that it will rotate on tapered oil films formed between these pads and the bearing surface 66 of member 61. This results in the surface 66 of member 61 carrying an axial thrust which may come upon the release member $R'$ by way of the release member $R^2$ in connection with driving the valve, whereby any undue pressure of the valve on its seat will be relieved and whereby power required to rotate the valve will be kept at a low and efficient value. A recess 33 to provide for timing adjustments of the valve is formed in outer ends of member $R'$ through which is received the lower end of springs 30; while two cap screws 34 form the driving contact of member $R'$ with the springs 30, by means of which the valve is rotated. A housing 67 surrounds the release drive members $R'$ and $R^2$ within which suitable lubrication can be secured, while dust and dirt is excluded from the working members, the parts are readily accessible upon removal of a few screws which fasten 67 to upper half of crank case 3.

As illustrated in the drawings valve stem 20 is integral with the exhaust spider 41 at bottom of valve 40, but the stem may be connected therewith in other suitable manners. A passage 52 formed in stem 20 connects with passage 42 in the exhaust spider and serves to admit the cooling water at bottom of jacket in valve 40. A cylindrical collar 53, carrying a curved tubular arm 54, which communicates with passage 52, is secured to valve stem 20 by a cap screw 55. A cap 70 having a conventional stuffing box 71 at its lower end is secured to bottom of cylinder head C and forms a chamber 73, supplied with water by conduit 72, surrounding the curved arm 54. This arrangement of parts constitutes an important improvement in water cooling of the valve 40, for a rotation of stem 20 forces water through arm 54 and up passage 52, the lower part of which 52$b$ is plugged, producing a pressure in water jacket of valve 40 which depends upon the rotation speed of the valve, and length of arm 54 and size of its mouth.

Due to rotation, water in the jacket of valve 40 exerts its greatest centrifugal pressure against walls at upper end region 40b, efficient cooling of the valve requires this upper region water to be removed. This is accomplished by making the mouth of arm 54 of suitable size and its radius greater than the outer radius of jacket space in region 40b, whereby water is delivered to jacket through passage 42 at a pressure sufficient to overcome the centrifugal action; tube 43 extending to nearly the inside top of jacket space provides a means for escape of the above mentioned water to the exhaust spider end where it leaves by passage 44 leading to passage 56 in the valve stem from which it is discharged into chamber 73, the lower part 56b of the passage in stem 20 is plugged. With the foregoing constructive features it is seen that each valve unit produces its own water circulation, removing efficiently the water which tends to remain at upper end region of valve jacket. Arm 54 naturally collects the cooler water in chamber 73, while that discharged from 56 along with other water passes up around the exhaust chamber E, about the walls of valve seat S and the combustion space walls, finally leaving the top of cylinder head by several openings and entering the valve manifold cap jacket W, finally emerging at W'. The bottom of exhaust chamber E has formed on its under side a stuffing box construction 74, employing a spiral spring 75 to keep the packing efficiently tight, thus preventing leaks past upper end of valve stem 20 and into inside of exhaust chamber E.

In the figures relating to the valve body, which rotates at ½ engine shaft speed, 45 denotes the exhaust port in the valve, through which and down the central lower region of valve the exhaust passes to chamber E, when this port is in communication with seat ports $p_6$ and $p_5$ leading to combustion spaces and their respective cylinders. A partition 46 in central chamber of valve 40 separates the exhaust region at lower end from the intake region above, its particular shape provides for efficient flow of gases. The intake end of valve is divided into regions 47a and 47b by a partition 47 extending from top of valve to the partition 46 and extending to outer surface of valve forming intake ports 47d' and 47b'. This arrangement is necessary to prevent intercommunication between the combustion spaces and their respective cylinders, such as would exist when part of port 47a' was registering with port $p_5$ leaving some of port 47b' registering with port $p_6$, the absence of partition 47 for such positions would result in cylinder $C^5$ sucking part of charge from cylinder $C^6$ by way of free communication between ports $p_6$ and $p_5$, thus causing unequal development of power by these cylinders. The openings 48a and 48b at top of valve body, together with openings 49a and 49b at bottom of exhaust spider 41 serve to support the core forming the water jacket space which separates the outer wall of valve from the central part wherein flow of gases takes place. These openings along with the constructional horizontal ones in exhaust spider are plugged up in the finished valve.

In Figs. 3 and 6 is shown the inlet spider 80 having legs 81 connected to a circular rim 82 which fits into the recess shown, in top of valve, in Fig. 7, and is fastened thereto by cap screws 83. The gases on the suction stroke pass between the legs of this spider and enter regions 47a and 47b. The upper part of spider 80 contains a reservoir space 84 having a circular retaining rim 86, situated above a circular base 85 on which the balance plug shoe P, of Figs. 13 to 16, presses in transmitting the axial balancing forces. The part of 84 not taken up by the plug shoe P is filled with oil supplied through a conduit 120 in manifold cap M, the top level of the oil in 84 being regulated by a screw 87 having a slanting surface 88 as clearly shown in Fig. 12. The oil after passing screw 87 descends a passage 89 having an outlet 89a in outer wall of valve near its bottom end, from which the valve and seat surfaces derive their lubrication. Due to difference in pressure between exhaust and intake ends of valve, and also due to centrifugal action against the conical seat the oil supplied through 89a works its way up the seat surface S and is collected in a circular groove 121, near top of the seat, which carries the oil to a pocket 122 formed in seat S, and from which the oil is removed through passage 123, shown clearly in Fig. 5; this oil may be carried to the release drive mechanism. Oil for each valve is delivered to a regulator unit 124 shown in section in Fig. 5, wherein 125 indicates one end of general supply pipe entering the regulator unit, the flow being regulated by adjustment of needle valve 126, a sight glass 127 is provided for inspection of the flow into cup 128 from which the oil goes to passage 120. The provisions for supplying, regulating and collecting the oil from the valve system as just described constitute one of the features of the present invention.

The balance plug shoe P contains two circular recesses 90 formed in its upper surface which receive the lower ends of the balance plugs of which 102 is the plug belonging to the cylinder $C^2$; this arrangement provides for transmission of the synchronous balancing pressure and also holds shoe P stationary against the rotation of surface 85 of intake spider 80. Tapered thrust pads 91 are formed on under side of shoe P and so inclined as to form tapered oil films between them and surface 85, thus reducing to a minimum the friction resistance to rotation offered by shoe P. My Patent No. 1,692,628 illustrates other features relating to plug shoe P, which here have been omitted for simplicity.

In Fig. 16 is shown the entrance into plug chambers $P^2$ and $P'$ of the balance pressure conduits $b^2$ and $b'$ whereby the synchronous balancing pressures for 3 strokes of the cycle, are transmitted from the combustion space to top surface of balance plugs whose areas are of sufficient size to offset the lifting effect on the conical valve produced at the ports of the combustion spaces. The plugs are provided with rings 103 and 104 for obvious reasons, and are recessed near the bottom end providing for a flat spring 110 being operatively locked thereto by pins 105 and curved thrust members 106 preferably integral with the plug. This construction permits the upward suction thrust on the valve, during the intake strokes, to be transmitted to spring 110 and balanced thereby. The end 111 which is integral with spring 110 and is made cylindrical and held in the valve manifold cap, a shoulder 112 being provided near outer end 113 which passes through a bushing 114 threaded into cap M and thus permitting the spring 110 to be set at desired level, and also providing means for producing such initial downward thrust as may be desirable to effectively balance the valve against the suction thrust.

Adjusting screw 115 shown clearly in Figs. 3 and 15 may be used to secure one of the following working adjustments;

(1) With a fairly stiff working spring 110, the lower end 116 of 115 is preferably adjusted so that it just contacts with the upward surface of 110 when the valve has expanded about its full amount due to absorption of heat in coming up to normal working conditions. Before contact is made the spring acts on the basis of being a cantilever; after contact is made it acts as a beam fixed at one end and supported at other end, in carrying the upward thrust of suction strokes.

(2) With a relatively weak spring 110, member 115 is adjusted to exert some downward pressure on the valve so that the spring unit may effectively handle the upward suction thrust due to lower pressure of the intake manifold.

The top ends of the balance chambers $P'$ and $P^2$ are closed by caps 130 whose plane surface 132 extends nearly to top of balance plug. A half cone region 133 is formed in the lower part of 131, its diameter being a little larger than that of balance passage $b^2$, and this space communicates with the balance passage $b^2$ as is clearly shown in Fig. 15. This deflecting half cone efficiently distributes the pressure medium onto top of a balance plug, and the construction reduces to a minimum the volume of the balancing conduit within the plug chamber.

In Fig. 3 is shown a part of a piston 142 belonging to cylinder $C^2$, along with its connecting rod 5. Between top of cylinder bloc 2 and the under surface of cylinder head C is the customary gasket 140 shown clearly in Fig. 4 wherein the piston 141 for cylinder $C'$ is shown in part section and located at top of stroke. The top flat surface 143 of piston 141 extends to nearly the top surface of gasket 140 while under part of head C is slightly recessed above the cylinder bore as indicated at 144. Extending above the 144 level is the raised part 145 of piston head whose shape and height of rise are determined in connection with the desired compression ratio. The region between the seat wall S and the top of piston head constitutes the improved combustion space wherein only a small percent of the volume lies directly above about ⅔ the piston head, and when the combustion processes are started, they act initially on only a part of the piston head, and this permits the use of higher compressions without the detrimental combustion knock, such as exists when a large part of the piston is initially exposed to combustion processes.

In Fig. 1 is shown the general plan of combustion space $B_3$ with its port $p_3$ leading to valve seat S, while the balancing pressure conduits $b'$ and $b^2$ give rise to very effective transmission of balancing pressure, being taken from the part of combustion space close to valve wall, as is clearly shown in Fig. 5.

What I claim is:

1. An internal combustion motor comprising a cylinder, a detachable cylinder head containing a combustion space, a valve chamber whose axis is vertical formed at one side of the head and communicating with the combustion space, a conical valve in the chamber, means for rotating the valve, a pressure shoe located adjacent the upper end of the valve, means for lubricating the pressure shoe, means for transferring the oil therefrom to the bottom regions of the valve chamber, and means for collecting and removing the lubricant at upper end of the valve chamber.

2. An internal combustion motor comprising a vertical axis valve chamber formed in a detachable cylinder head, a port affording communication between the chamber and the combustion space formed in the head, a conical valve in the chamber comprising an outer shell, a water space, an inner shell wherein flow of gases takes place, an exhaust spider with inlet and outlet water passages formed at bottom end of the valve, a valve stem for rotating the valve connected to the exhaust spider and containing an inlet and outlet water passage communicating with the passages in the spider, a tubular arm connected to the valve stem and arranged to force water into lower portion of jacket space of the valve at a pressure sufficient to cause a return flow of water from the top regions of the valve jacket down a tubular passage leading to the exhaust spider and valve stem and thence to the supply chamber.

3. A watercooled valve unit comprising an outer shell, an inner shell separated therefrom by a water space, a partition in the upper end of the inner shell extending to the surface of the outer shell and dividing the intake end and port of the valve into two regions, an exhaust spider formed at bottom end of valve, a valve stem connected to the spider, a passage in the valve and stem and spider for escape of water from upper end of conical valve, a passage formed in the stem and spider for admitting water to lower end of valve jacket, a curved tubular arm connected to stem and arranged to force water by rotation of stem into lower end of valve at a pressure sufficient to cause a return of water from upper end of valve, an intake spider at top of valve containing a pressure shoe reservoir, a conduit from said reservoir to lower end of valve for conveying oil to lubricate the valve seat and valve.

4. An internal combustion motor comprising a cylinder, a cylinder head containing a combustion space, a valve chamber whose axis is vertical formed at one side of the head and communicating with the combustion space, a conical valve in the chamber, means for rotating the valve, a pressure shoe located adjacent the large end of the valve, means for lubricating the pressure shoe, means for transferring the oil therefrom to the bottom regions of the valve chamber, and means for collecting and removing the lubricant at upper end of the valve chamber.

5. An internal combustion motor comprising a cylinder, a cylinder head containing a combustion space, a valve chamber whose axis is vertical formed at one side of the head and communicating with the combustion space, a valve in said chamber, means for rotating said valve, a pressure member located adjacent the upper end of said valve, means for lubricating said pressure member, means for transferring oil therefrom to the lower regions of the valve chamber and means for collecting and removing the lubricant at the upper end of the valve chamber.

6. An internal combustion motor comprising a vertical axis valve chamber formed in a cylinder head thereof, a valve in said chamber comprising an outer shell providing a water space and an inner shell wherein flow of gases takes place, a valve stem for said valve, said stem being provided with inlet and outlet passages communicating with said water space, means connected to said valve stem and rotating therewith for causing water to flow thru said inlet passage and means providing for escape of the water from said outlet passage.

7. An internal combustion motor comprising a vertical axis valve chamber formed in a cylinder head thereof, a valve in said chamber comprising an outer shell providing a water space and an inner shell wherein flow of gases takes place, a valve stem for said valve, said stem being provided with inlet and outlet passages communicating with said water space, means for causing water to flow thru said inlet passage, comprising an open ended laterally extending tubular arm communicating with said inlet and arranged to rotate with said stem, a water chamber in which said arm rotates, and means providing escape of the water from said outlet passage.

8. An internal combustion motor comprising a vertical axis valve chamber formed in a cylinder head thereof, a valve in said chamber comprising an outer shell providing a water space and an inner shell wherein flow of gases takes place, a valve stem for said valve, said stem being provided with inlet and outlet passages communicating with said water space, means for causing water to flow into said inlet passage, and means for removing water therefrom through said outlet passage, comprising a duct connecting said outlet passage with said water space adjacent the periphery thereof.

9. An internal combustion motor comprising a vertical axis valve chamber formed in a cylinder head thereof, a valve in said chamber comprising an outer shell providing a water space and an inner shell wherein flow of gases takes place, a valve stem for said valve, said stem being provided with inlet and outlet passages communicating with said water space, means for causing water to flow into said inlet passage comprising a tubular arm extending laterally to a distance greater than the effective radius of said water space.

10. A watercooled valve unit comprising an outer shell, an inner shell separated therefrom by a water space, a partition in the upper end of the inner shell extending to the surface of the outer shell and dividing the intake end and port of the valve into two regions, a valve stem for said valve, said stem being provided with inlet and outlet passages communicating with said water space, means for causing water to flow thru said inlet passage, comprising an open ended laterally extending tubular arm communicating with said inlet and arranged to rotate with said stem, a water chamber in which said arm rotates, and means providing escape of the water from said outlet passage.

In testimony whereof I have affixed my signature to this specification.

GUY B. COLLIER.